(12) United States Patent
Huang

(10) Patent No.: US 8,422,132 B2
(45) Date of Patent: Apr. 16, 2013

(54) INTEGRATED PLANAR POLARIZING DEVICE

(75) Inventor: Herb He Huang, Shanghai (CN)

(73) Assignee: Shanghai Lexvu Opto Microelectronics Technology Co., Ltd., Shanghai (CN)

( * ) Notice: Subject to any disclaimer, the term of this patent is extended or adjusted under 35 U.S.C. 154(b) by 639 days.

(21) Appl. No.: 12/629,644

(22) Filed: Dec. 2, 2009

(65) Prior Publication Data

US 2010/0134886 A1      Jun. 3, 2010

Related U.S. Application Data

(60) Provisional application No. 61/119,127, filed on Dec. 2, 2008, provisional application No. 61/142,853, filed on Jan. 6, 2009.

(51) Int. Cl.
*G02B 5/30* (2006.01)

(52) U.S. Cl.
USPC ............ 359/485.05; 359/489.07; 359/489.11; 359/855; 359/871

(58) Field of Classification Search ............. 359/485.05, 359/489.07, 489.11, 855, 871, 883; 349/5, 349/96; 353/20
See application file for complete search history.

(56) References Cited

U.S. PATENT DOCUMENTS

| | | | |
|---|---|---|---|
| 1,610,423 A | 12/1926 | Cawley | |
| 4,928,123 A | 5/1990 | Takafuji | 353/20 |
| 5,124,841 A | 6/1992 | Oishi | 359/487 |
| 5,237,399 A | 8/1993 | Inada et al. | 358/60 |
| 5,410,421 A | 4/1995 | Huignard et al. | 359/15 |
| 5,428,469 A | 6/1995 | Willett | 359/41 |
| 5,452,128 A | 9/1995 | Kimura | 359/487 |
| 5,485,310 A | 1/1996 | Inada | 359/495 |

(Continued)

FOREIGN PATENT DOCUMENTS

| | | |
|---|---|---|
| EP | 0 573 905 A1 | 12/1993 |
| EP | 0 615 148 A2 | 9/1994 |

(Continued)

*Primary Examiner* — Frank Font
(74) *Attorney, Agent, or Firm* — J.C. Patents

(57) ABSTRACT

The embodiments of the present invention provide an integrated planar polarizing device and methods of fabrication. The device, in the order of incidence along an optical path of an incident light beam from back position to front position, comprises a planar array of micro mirrors, a quarter wave retarder film and a reflective polarization plate. The micro mirrors are regularly spaced-apart in an identical tilted angle α relative to a base plane. The quarter wave retarder film is positioned between the micro mirrors and the reflective polarization plate. The reflective polarization plate is in parallel to the base plane and is adapted to transmit and polarize a first polarized light of the incident light beam in a first polarization state, and to reflect and polarize a second polarized light of the incident light beam in a second polarization, The micro mirrors are adapted to reflect the second polarized light passing and polarized through the quarter wave retarder film first time to pass and be polarized through the quarter wave retarder film second time, thereby converting the second polarized light to be a third polarized light in the first polarization state which can transmit the reflective polarization plate. The planar array of micro mirrors, the quarter wave retarder film and the reflective polarization plate are embedded in a transparent medium. The embodiments of the present invention could improve in device integration and simplification in assembly robustness.

26 Claims, 11 Drawing Sheets

U.S. PATENT DOCUMENTS

| | | | |
|---|---|---|---|
| 5,555,186 A | 9/1996 | Shioya | 359/40 |
| 5,555,189 A | 9/1996 | Yamazato et al. | 364/492 |
| 5,566,367 A | 10/1996 | Mitsutake et al. | 359/497 |
| 5,650,873 A | 7/1997 | Gal et al. | 359/487 |
| 5,764,412 A * | 6/1998 | Suzuki et al. | 359/485.03 |
| 5,940,149 A | 8/1999 | Vanderwerf | 359/5 |
| 5,978,136 A * | 11/1999 | Ogawa et al. | 359/485.04 |
| 6,067,193 A * | 5/2000 | Sekine et al. | 359/486.02 |
| 6,147,802 A * | 11/2000 | Itoh et al. | 359/242 |
| 6,219,112 B1 * | 4/2001 | Yoneyama et al. | 349/5 |
| 6,373,629 B1 * | 4/2002 | Yamagishi et al. | 359/485.04 |
| 6,373,630 B1 | 4/2002 | Lee et al. | 359/495 |
| 6,523,958 B2 * | 2/2003 | Takezawa et al. | 353/20 |
| 6,646,806 B1 * | 11/2003 | Bierhuizen | 359/618 |
| 7,002,743 B2 * | 2/2006 | Seo et al. | 359/485.05 |
| 7,011,412 B2 * | 3/2006 | Ogawa et al. | 353/20 |
| 7,072,096 B2 * | 7/2006 | Holman et al. | 359/298 |
| 7,085,050 B2 * | 8/2006 | Florence | 359/485.05 |
| 7,118,229 B2 * | 10/2006 | Iechika et al. | 353/102 |
| 7,369,312 B2 * | 5/2008 | Stark | 359/484.01 |
| 7,472,995 B2 * | 1/2009 | Yamauchi et al. | 353/20 |
| 2006/0193048 A1 * | 8/2006 | Stark | 359/495 |
| 2008/0198472 A1 * | 8/2008 | Yatsu | 359/649 |
| 2008/0316431 A1 * | 12/2008 | Okuyama et al. | 353/20 |

FOREIGN PATENT DOCUMENTS

| | | |
|---|---|---|
| EP | 0 757 274 A1 | 2/1997 |
| EP | 0 777 146 A1 | 6/1997 |
| EP | 0 856 762 A1 | 8/1998 |
| JP | 8-179311 | 7/1996 |
| JP | 8-220531 | 8/1996 |
| JP | 9-15534 | 1/1997 |
| JP | 9-145926 | 6/1997 |
| JP | 9-146061 | 6/1997 |
| WO | WO 95/17691 | 6/1995 |
| WO | WO 95/17699 | 6/1995 |
| WO | WO 95/27919 | 10/1995 |
| WO | WO 96/35140 | 11/1996 |

* cited by examiner

INTEGRATED PLANAR POLARIZING DEVICE

CROSS-REFERENCE TO RELATED APPLICATIONS

This application claims priority to Provisional Patent Applications No. 61/119,127, filed on Dec. 2, 2008, entitled "An Integrated Planar Polarizing Device", and No. 61/142,853, filed on Jan. 6, 2009, entitled "A Planar Composite Polarizer", which are hereby incorporated by reference in their entirety.

FIELD OF THE TECHNOLOGY

The present invention relates to a planar polarization conversion device applicable to liquid crystal on silicon (LCOS) projection systems. More specifically, the present invention provides an integrated planar polarizing device and methods of fabrication, for practical use of single-panel LCOS projection systems requiring polarized light, even though the same principle is applicable to the multi-panel LCOS projection systems.

BACKGROUND

The core components and subsystems of a typical single-panel LCOS projection system in a compact configuration include, in the order of the optical path, a light source, a polarizer, a polarizing beam splitter (PBS), an LCOS modulation imager, and last but not least, a projection lens. Both compactness and optical efficiency are highly expected for such a polarizer used in a pico projection system with limited allowance in both physical size and power consumption of the key components and overall system.

Unpolarized light includes a linear component and an orthogonal component. A common method for producing polarized light for such an LCOS projection system comprises the use of the PBS. The linearly polarized component light, herein named P polarization, is either transmitted or reflected by the PBS to the LCOS panel, while the orthogonal component, named S polarization, is either reflected away or transmitted unused in a perpendicular direction accordingly. This PBS also transmits or reflects modulated light by the LCOS imager in a rotated polarization state, from P polarization to S polarization or vice versa accordingly towards the projection lens for projection display. Theoretically, at least 50% of illumination is unused or discarded from the PBS by the system, thereby substantially limiting optical efficiency of the system in utilization of illumination from the light source.

A number of attempts have been made in the prior art to recycle the reflected unused polarization component in such a delivery subsystem of polarization light to illuminate the LCOS imager. Among those, plate-like element polarization converters are most attractive because of their most adequate applicability to a compact single-panel projection system.

An earlier plate-like polarization converter is disclosed in U.S. Pat. No. 5,566,367. Another planar polarization converter for polarizing a light beam is disclosed in U.S. Pat. No. 5,940,149.

FIG. 1a is a cross-section view illustrating a conventional plate-like polarization converter, and FIG. 1b is a cross-sectional view of the plate-like polarization converter of FIG. 1a further comprising a light deviator assembly in a back position and a beam integrating film in a front position along the light path. As shown in FIG. 1a, in the order of incidence along the optical path of the light beam defining front position and back position, the planar polarization converter includes a prismatic film 640, a polarization film sheet 660 and a reflective polarization film 670. The prismatic film 640 has a first prismatic surface 642. The first prismatic surface 642 has alternating transmissive prismatic facets 644 and reflective prismatic facets 646 positioned at supplementary base angles, each of the transmissive prismatic facets 644 is positioned at a first base angle v relative to a base plane 601, and each of the reflective prismatic facets 646 is positioned at a second base angle generally equal to 180°-v. The polarization film sheet 660 specifically may be a quarter wave retarder film positioned between the prismatic film 640 and the reflective polarization film 670. A deviated light beam 622 transmits through the transmissive prismatic facets 644 and the quarter wave retarder film 660, and a first light beam 624a of the incident light beam in a first polarization state P transmits through the reflective polarization film 670, and a second light beam 626 of the incident light beam in a second polarization state S is reflected by the reflective polarization film 670. The second light beam 626 is reflected by the reflective prismatic facets 646 after transmitting through the quarter wave retarder film 660, and then transmitting through the quarter wave retarder film 660 once again. Since the second light beam 626 transmits through the quarter wave retarder film 660 twice, the second light beam 626 is polarized to be a third light beam 624b in the first polarization state. The third light beam 624b could transmit through the reflective polarization film 670.

As shown in FIG. 1b, additional embodiments of the above planar polarization converter further include adaptation of a light alignment assembly 630 and a prismatic beam-integrating sheet 690. The light alignment assembly 630 consists of collimating elements and light deviating elements on a prismatic surface, and the prismatic beam-integrating sheet 690 comprises collimating elements on another prismatic surface. Such a planar polarization converter is aligned optically to receive and convert the unpolarized collimated light beam to linearly polarized light suitable for adequate use in a single-panel LCOS projector.

Further need for improvement in device integration and simplification in assembly robustness is recognized in at least two aspects among others, including the integration and handling of such a polarization converter assembly and optical efficiency of conversion in terms of transmission loss. The polarization converter disclosed by all the embodiments in U.S. Pat. No. 5,940,149 still requires a spatial assembly of three to five separate plate-like but non-optically-flat components in adequate optical alignment, which increases the complexity of its integration with a projection system. Besides, to enable challenging infield application, all the sub components are preferably made from solid state materials instead of polymeric substrates with improved robustness of material roughness and precision of fabrication and assembly.

SUMMARY

Embodiments of the present invention provide an integrated planar polarizing device and methods of fabrication for improvement in device integration and simplification in assembly robustness.

The embodiments of the present invention provide an integrated planar polarizing device, and the integrated planar polarizing device, in the order of incidence along an optical path of an incident light beam from back position to front position, comprises a planar array of micro mirrors, a quarter wave retarder film and a reflective polarization plate, wherein the planar array of micro mirrors are regularly spaced-apart in an identical tilted angle α relative to a base plane;

the quarter wave retarder film is positioned between the micro mirrors and the reflective polarization plate;

the reflective polarization plate is in parallel to the base plane and is adapted to transmit and polarize a first polarized light of the incident light beam in a first polarization state, and to reflect and polarize a second polarized light of the incident light beam in a second polarization;

the micro mirrors are adapted to reflect the second polarized light passing and polarized through the quarter wave retarder film first time to pass and be polarized through the quarter wave retarder film second time, thereby converting the second polarized light to be a third polarized light in the first polarization state which can transmit through the reflective polarization plate; and the planar array of micro mirrors, the quarter wave retarder film and the reflective polarization plate are embedded in a transparent medium.

The embodiments of the present invention also provide a method of fabricating an embedded micro mirror plate, wherein the method comprises the following steps:

providing a first substrate;

producing a set of first parallel symmetric V-notches into a front position of the first substrate, each of the first parallel symmetric V-notches consisting of a pair of first tilted facet and second tilted facet, and each second tilted facet being equal to a tilted angle α relative to a base plane;

depositing a first reflective film conformally covering the first parallel symmetric V-notches on the first substrate;

lithographically patterning and selectively removing portion of the first reflective film associated with first tilted facets to form micro mirrors above second tilted facets;

depositing a first thick film of a transparent medium on the front position of the first substrate;

planarizing the deposited first thick film; and detaching remaining portion of the first substrate by selectively etching, or combination of first mechanical grinding, and then selectively etching removal of the first substrate from the first thick film and the micro mirrors.

The embodiments of the present invention also provide a method of fabricating an integrated planar polarizing device, comprising the above method of fabricating the embedded micro mirror plate, and further comprising the following steps:

providing a third substrate;

producing a set of third parallel symmetric V-notches into the third substrate;

depositing a forth thick film of the transparent medium above the third parallel symmetric V-notches;

planarizing the deposited forth thick film;

depositing a second reflective film;

lithographically patterning the second reflective film by etching to form a planar polarizing wire grid array of nano-scale reflective fine strips;

depositing a fifth thick film of the transparent medium to gap fill the nano-scale reflective fine strips;

planarizing the fifth thick film;

detaching remaining portion of the third substrate from the planarized forth thick film adhered; and adhering the collimating output polarizing plate with the forth thick film bonded to the third thick film of embedded micro mirror plate.

The embodiments of the present invention also provide a method of fabricating a collimating output polarizing plate, wherein the method comprises the following steps:

providing a third substrate;

producing a set of third parallel symmetric V-notches into the third substrate;

depositing a forth thick film of a transparent medium above the third parallel symmetric V-notches;

planarizing the deposited forth thick film;

depositing a second reflective film;

lithographically patterning the second reflective film by etching to form a planar polarizing wire grid array of nano-scale reflective fine strips;

depositing a fifth thick film of the transparent medium to gap fill the nano-scale reflective fine strips;

planarizing the fifth thick film; and detaching remaining portion of the third substrate from the planarized forth thick film adhered.

The embodiments of the present invention could improve in device integration and simplification in assembly robustness. In addition, the integrated planar polarizing device is made mostly from solid state transparent materials such as silicon, silicon dioxide and aluminum and readily fabricated through silicon wafer-based micromachining processes, or solid transparent polymeric materials via micro molding and film deposition processing, that efficiently converts increased portion of unpolarized light to linearly polarized light suitable for use in a single-panel LCOS projection systems.

BRIEF DESCRIPTION OF THE DRAWINGS

FIG. 8b is a cross-sectional view of the integrated planar polarizing device of FIG. 7 having a light-redirecting index matching coating;

DETAILED DESCRIPTION

In order to make the objects, technical solutions and merits of the present invention clearer, a further detailed description of embodiments of the present invention is given by reference to accompanying drawings.

Embodiment One

Figure 1A:
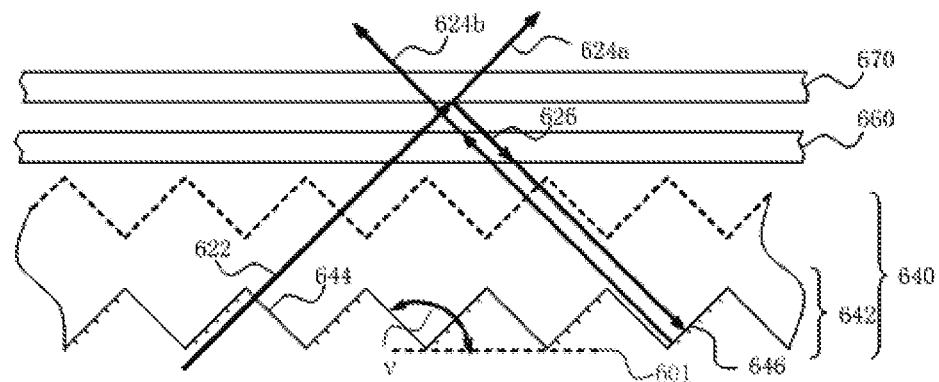
FIG. 1a is a cross-section view illustrating a conventional plate-like polarization converter; including a prismatic film, a reflective polarization film and a polarization film sheet.
Figure 1B:
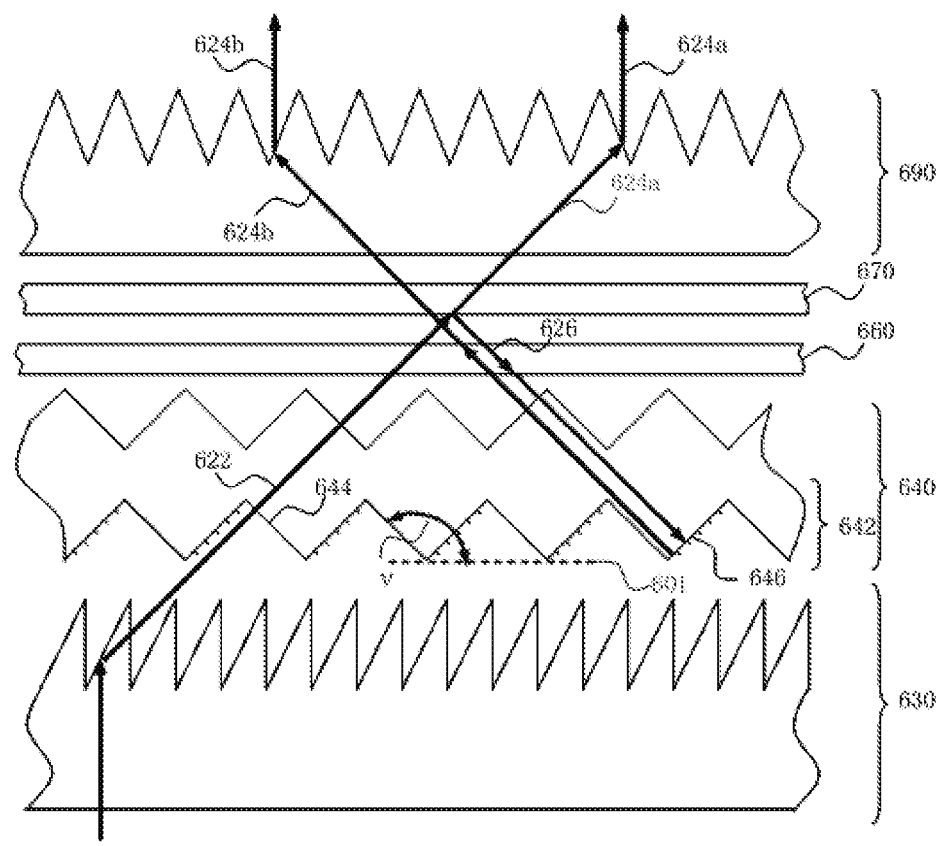
FIG. 1b is a cross-sectional view of the plate-like polarization converter of FIG. 1a further comprising a light deviator assembly in the back position and a beam integrating film in the front position along the light path.
Figure 2:
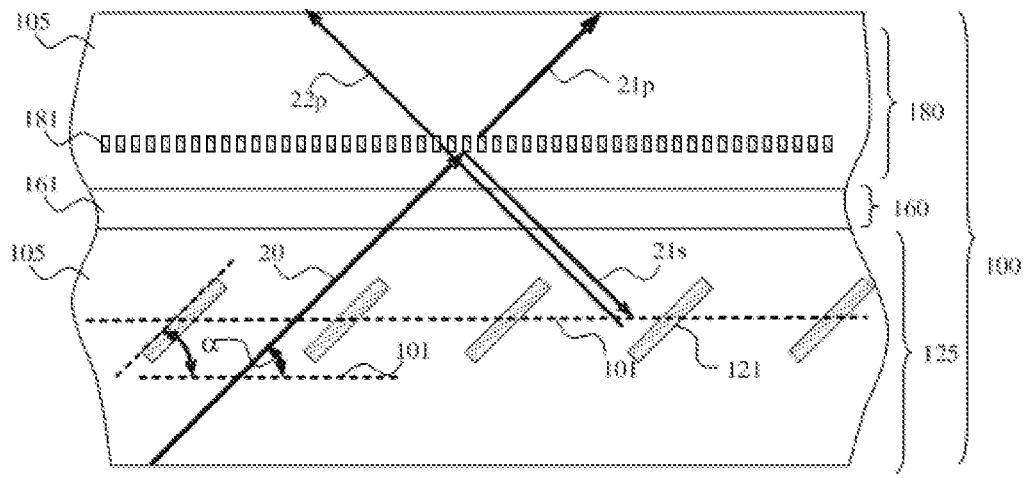
FIG. 2 is a cross-sectional view of an integrated planar polarizing device according to Embodiment one of the present invention.

FIG. 2 is a cross-sectional view of an integrated planar polarizing device according to Embodiment one of the present invention.

As shown in FIG. 2, in the present embodiment, an integrated planar polarizing device 100 for polarizing an incident light beam 20 is provided. Parallel to a base plane 101 and in the order of incidence along an optical path of the incident light beam 20 from back position to front position, the device 100 comprises a planar array of micro mirrors 121, a quarter wave retarder film 160 and a reflective polarization plate 180. Specifically, each of the micro mirrors 121 is regularly spaced-apart in an identical tilted angle α relative to the base plane 101. The quarter wave retarder film 160 is positioned between the micro mirrors 121 and the reflective polarization plate 180. Preferably, the quarter wave retarder film 160 may be one layer of quarter wave retarder plate 161 parallel to the base plane 101, and the quarter wave retarder plate 161 is adherently sandwiched between the reflective polarization plate 180 and an embedded micro mirror plate 125, in which the micro mirrors 121 is embedded. The reflective polarization plate 180 is in parallel to the base plane 101 and is adapted to transmit and polarize a first polarized light 21p of the incident light beam 20 in a first polarization state, P, and to reflect and polarize a second polarized light 21s of the incident light beam 20 in a second polarization, S. The reflective polarization plate 180 preferably may be a planar polarizing wire grid array of nano-scale reflective fine strips 181, regularly spaced-apart in parallel to the base plane 101. The micro mirrors 121 are adapted to reflect the second polarized light 21s passing and polarized through the quarter wave retarder film 160 first time to pass and be polarized through the quarter wave retarder film 160 second time, thereby converting the second polarized light 21s to be a third polarized light 22p in the first polarization state which can transmit through the reflective polarization plate 180. The planar array of micro mirrors 121, the quarter wave retarder film 160 and the reflective polarization plate 180 are embedded in a transparent medium 105.

As one of the most practical embodiments of the present invention, the transparent medium may be made of silicon oxide or solid transparent polymeric materials. The micro mirrors may be made of any one or any combination of silver, aluminum, copper, titanium, mercury and gold. The nano-scale reflective fine strips may be made of any one or any combination of silver, copper, aluminum, titanium and gold.

The present embodiment could improve in device integration and simplification in assembly robustness. In addition, the integrated planar polarizing device of the present embodiment is made mostly from solid state transparent materials such as silicon, silicon dioxide and aluminum and readily fabricated through silicon wafer-based micromachining processes, or solid transparent polymeric materials via micro molding and film deposition processing, that efficiently converts increased portion of unpolarized light to linearly polarized light suitable for use in a single-panel LCOS projection systems.

In the above adherently-stacking configuration, all the interfaces between any adjacent plates of the above are adequately processed as optically flat and with appropriate optical coatings for minimizing light diffraction and preventing alternation of light path as the adjacent plates are adhered to each other for forming the integrated planar polarizing device.

Embodiment Two

Figure 3:
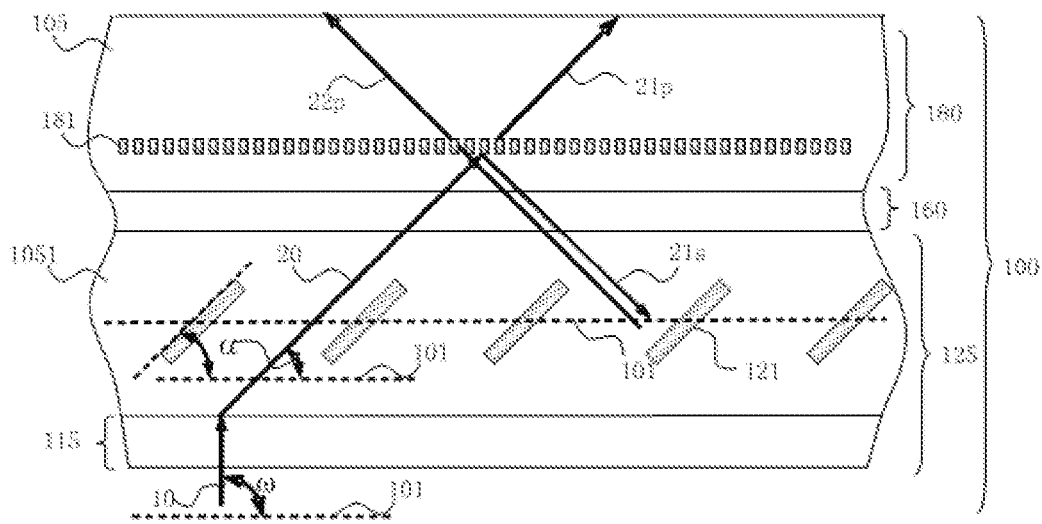
FIG. 3 is a cross-sectional view of an integrated planar polarizing device according to embodiment two of the present invention.

FIG. 3 is a cross-sectional view of an integrated planar polarizing device according to embodiment two of the present invention, further incorporating a light-directing surface structure 115 in the back position for deviating an original light beam 10.

The light-directing surface structure 115 is adapted to direct the original light beam 10 in an original incident angle ω relative to the base plane 101 to become the incident light beam 20 in an incident angle relative to the base plane 101, and the incident angle is equal to the tilted angle α.

The incident light beam 20 deviated from the original light beam 10, in the tilted angle α and in parallel to the micro mirrors 121, is led enter inside of the integrated planar polarizing device 100 first through the quarter wave retarder plate 160 to the reflective polarization plate 180. Upon impinging the planar polarizing wire grid array consisting of nano-scale reflective fine strips 181, collimated but unpolarized, the deviated incident light beam 20 is split to the first polarized light 21p in first polarization state, P, which continues to transmit toward the front position with the same tilted angle α, and the second polarized light 21s in second polarization state, S, which is reflected backwards towards the micro mirrors 121. The second polarized light 21s in second polarization state, S, transmits through the quarter wave retarder plate 160 the first time, then is reflected back by the planar array of micro mirrors 121 and transmits through the quarter wave retarder plate 160 the second time with an 90° rotation of polarization to become the third polarized light 22p in first polarization state, P, in a tilted angle 90°α a relative to the base plate 101 towards and passing through the planar polarizing wire grid array consisting of nano-scale reflective fine strips 181 (in an alternative angle).

Preferably, the micro mirrors 121 and the light-directing surface structure 115 may be embedded in a first transparent medium 1051 as the embedded micro mirror plate 125, as shown in FIG. 3.

Figure 4A:
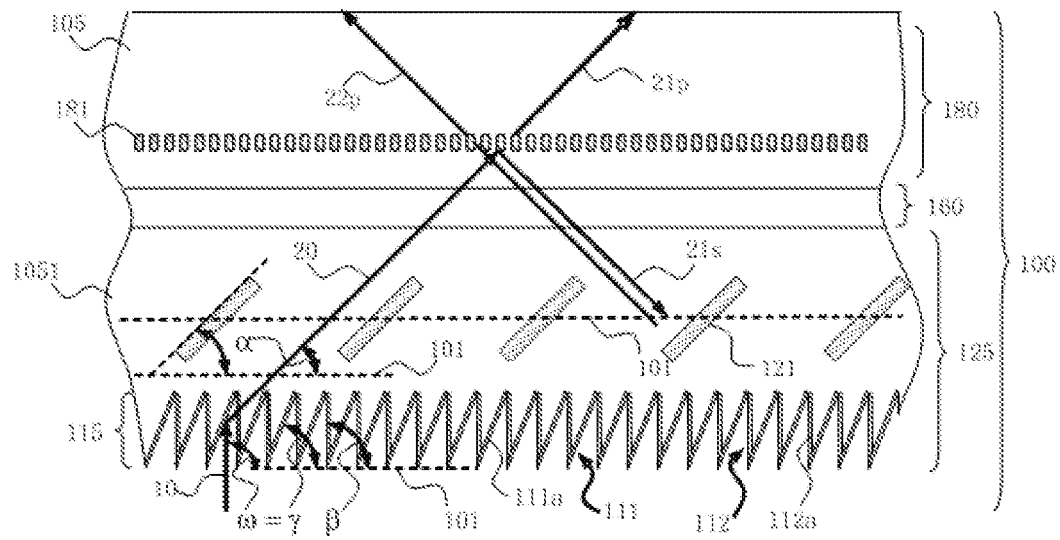
FIG. 4a is a cross-sectional view of the integrated planar polarizing device of FIG. 3 having a light-directing prismatic surface as the light-directing surface structure.

As shown in FIG. 4a, the light-directing surface structure 115 may be a light-directing prismatic surface in the back position. The light-directing prismatic surface comprises a planar array of incident-reflecting facets 111 in a first inlet angle β relative to the base plane 101 continuously interleaved with incident-parallel facets 112 in a second inlet angle γ relative to the base plane 101. The light-directing prismatic surface alters light path of the original light beam 10 to be parallel to the micro mirrors 121, i.e. the original light beam 10 is directed into the first transparent medium 1051 along the tilted angle α through deflection by the incident-reflecting facets 111 when the original angle ω is equal to the second inlet angle γ.

In one of the most practical configurations for projection system application, the original light beam 10 is set perpendicular to the base plane 101, i.e., perpendicular to the integrated planar polarizing device 100 and parallel to the incident-parallel facets 112, or the original incident angle to is equal to the second inlet angle γ equal to 90° relative to the base plane 101. Preferably, the incident-parallel facets 112 are configured perpendicular to the base plane 101 for inducing parts of the original light beam 10 perpendicular to the base plane 101, and the original incident angle ω and the second inlet angle γ are equal to 90°.

In the above light-directing surface structure 115, each of the incident-parallel facets 112 may be coated with an incident-parallel antireflective film 112a, and/or each of the incident-reflecting facets 111 may be coated with an incident-reflecting enhancing film 111a, as shown in FIG. 4a. The incident-reflecting enhancing film 111a may be made of any one or any combination of silver, aluminum, copper, titanium and gold.

Alternatively, each of the incident-reflecting facets 111 may be coated with an incident-reflecting index matching coating for improving reflection of the original light beam 10 to the incident light beam 20 in the tilted angle α in both precision and optical efficiency. On the other hand, an incident-parallel antireflective coating may be placed onto the incident-parallel facets 112 for reducing the reflection and/or deflection loss as the original light beam 10 after reflection by the incident-reflecting facets 111 impinges upon the incident-parallel facets 112.

Figure 4B:
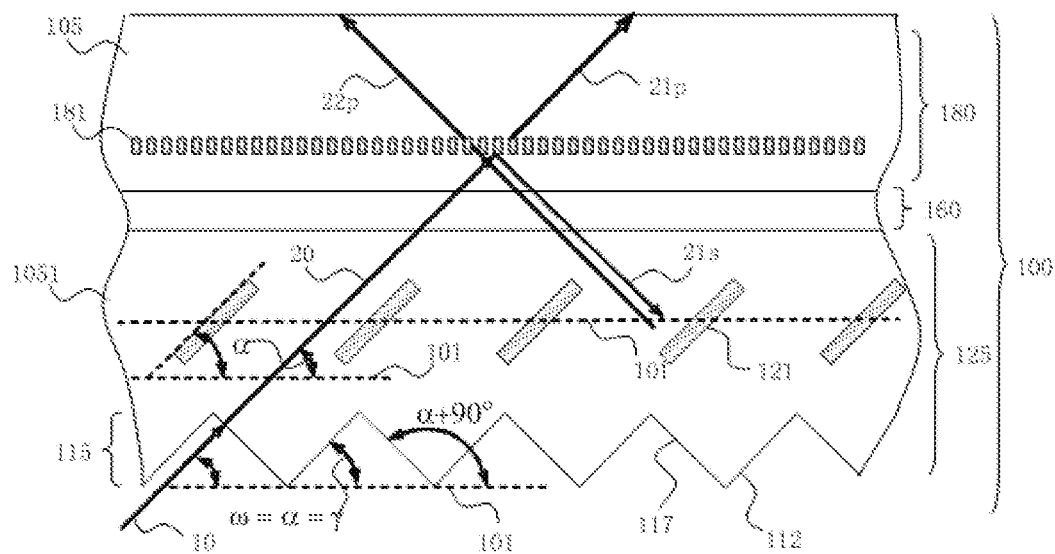
FIG. 4b is a cross-sectional view of the integrated planar polarizing device of FIG. 3 having a complementary light-directing prismatic surface as the light-directing surface structure.

In one of the simplest configuration for projection application, as shown in FIG. 4b, the light-directing surface structure 115 alternatively may be a complementary light-directing prismatic surface in the back position. The complementary light-directing prismatic surface comprises a planar surface array of incident-facing facets 117 in a third inlet angle α+90° relative to the base plane 101 continuously interleaved with incident-parallel facets 112 in the second inlet angle γ relative to the base plane 101, and the second inlet angle γ is equal to the original incident angle ω and the tilted angle α. Even though the original light beam 10 has to be aligned in the same tilted angle α as for micro mirrors 121 relative to the base plane 101, optical loss in inducing the original light beam 10 into the integrated planar polarizing device 100 is minimized. Preferably, each of the incident-facing facets 117 may be coated with an antireflective film.

The above composite microstructures in the embedded micro mirror plate 125 may be fabricated by typical means of silicon wafer-based micromachining processes if silicon based materials are used as the base transparent medium or via micro molding in combination with reflective metal deposition if solid polymeric compounds used as the base transparent medium. Through the disclosed integrated planar polarizing device, majority portion of a collimated unpolarized light is converted to polarized light output in one polarization state.

Embodiment Three

Figure 5:
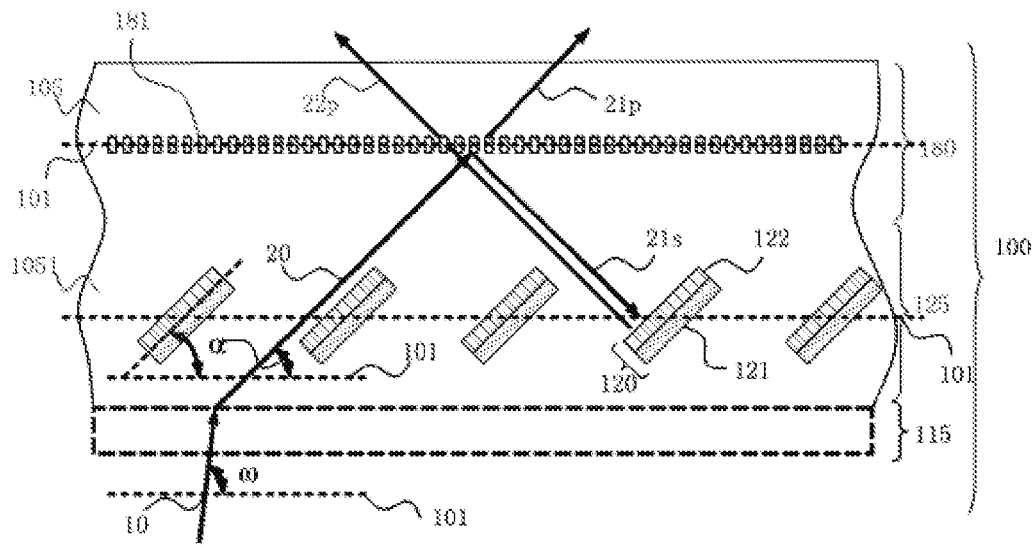
FIG. 5 is a cross-sectional view of an integrated planar polarization device according to embodiment three of the present invention.

FIG. 5 is a cross-sectional view of an integrated planar polarization device according to embodiment three of the present invention, which polarizes the original light beam 10, unpolarized and collimated as induced from an outside light source. The integrated planar polarizing device 100 with all its constituent layers of microstructure is parallel to the base plane 101.

In the present embodiment, the integrated planar polarizing device 100, which is based on the above embodiments, has an alternative micro optical configuration related to the quarter wave retardation plate 161. Instead of sandwiching the quarter wave retarder plate 161 as shown in FIG. 2, the integrated planar polarizing device 100 is composed by adhering the reflective polarizing plate 180 to the embedded micro mirror plate 125, which further comprises a planar array of micro quarter wave retarder plates 122 embedded in the first transparent medium 1051. Each of the micro quarter wave retarder plates 122 pairs and stacks above one of the micro mirrors 121 in parallel and optical alignment tilted in the identical tilt angle α relative to the base plane 101 and facing the front position. The micro quarter wave retarders 122 and the micro mirrors 121 form a planar array of micro reflective retarder plates 120.

Figure 6:
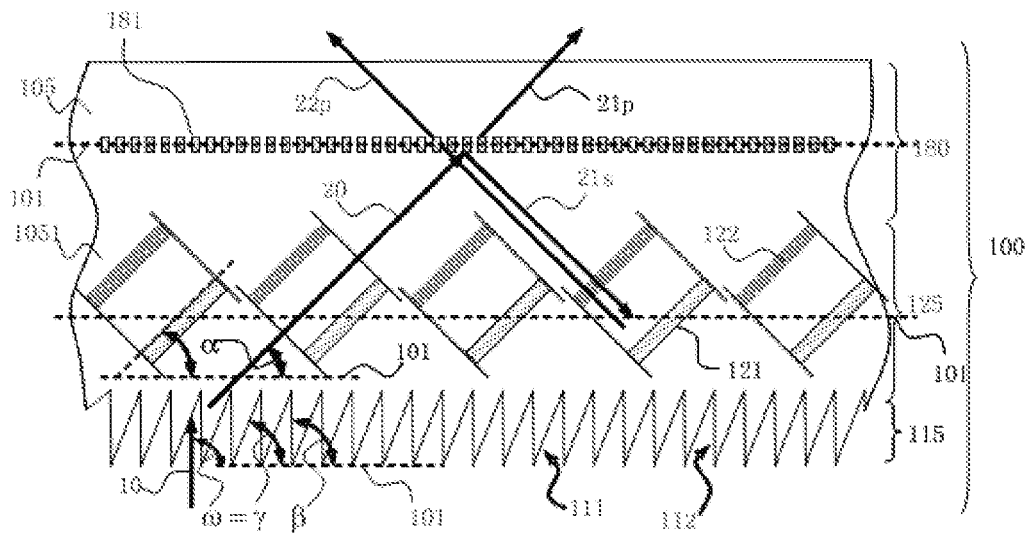
FIG. 6 is a cross-sectional view of the integrated planar polarization device according to an extended embodiment of the present invention.

Such a modified configuration helps eliminating the transmission loss of unpolarized but deviated incident light beam 20 first through the quarter wave retarder plate 160 encountered in the previous configuration shown in FIG. 2 and FIG. 3, as long as those micro quarter wave retarder plates 122 are sufficiently thin as the reflective micro mirrors 121. Alternatively, the reflective micro mirrors 121 and the micro quarter wave retarder plates 122 may be spaced from each other with appropriated distance, as shown in FIG. 6.

Herein both the planar array of micro reflective retarder plates 120 and the planar polarizing wire grid array of nano-scale reflective fine strips 181 may be embedded in the transparent medium 105 in solid state like silicon dioxide. The tilted angle α is generally configured to be equal to or close to 45°.

The layered composite microstructure in the integrated planar polarizing device may be fabricated by typical means of silicon wafer-based micromachining processes. Through the disclosed integrated planar polarizing device, majority portion of a collimated and unpolarized light is converted to polarized light output in one polarization state.

In the present embodiment as shown in FIG. 5, the light-directing prismatic surface may be used for inducing the original collimated unpolarized light beam 10 perpendicular to the device 100 and directing it in parallel to micro reflective retarder plates 120.

Preferably, the micro reflective retarder plates 120 and the light-directing surface structure 115 are embedded in the first transparent medium 1051 as the embedded micro mirror plate 125. Alternatively, the reflective polarization plate 180, the micro reflective retarder plates 120 and the light-directing surface structure 115 may be embedded in the same transparent medium 105. The light-directing surface structure 115 may be the light-directing prismatic surface or the complementary light-directing prismatic surface.

Therein the embedded micro mirror plate 125 is readily fabricated through silicon-based wafer micromachining processing measures including but not limited to silicon photolithographic patterning, reflective metal deposition and photolithographic patterning, silicon dioxide deposition and planarization.

Embodiment Four

Figure 7:
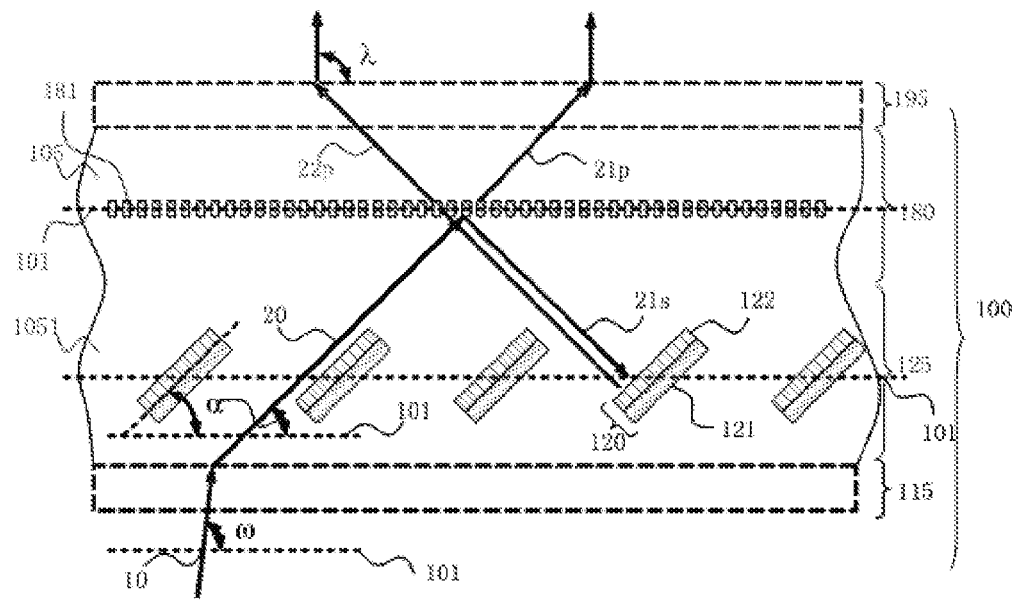
FIG. 7 is a cross-sectional view of an integrated planar polarizing device according to embodiment four of the present invention.

FIG. 7 is a cross-sectional view of an integrated planar polarizing device according to embodiment four of the present invention, further incorporating a light-redirecting surface structure 195 in the front position for collimating output light.

The light-redirecting surface structure 195 may be built into the device 100 itself in the front position that directs diverged light beams as re-collimated light output. The light-redirecting surface structure 195 is adapted to refract the first polarized light 21p and the third polarized light 22p both transmitted through the reflective polarization plate 180 to be re-collimated and transmitted out of the light-redirecting surface structure 195 in an identical output angle λ relative to the base plane 101.

Figure 8A:
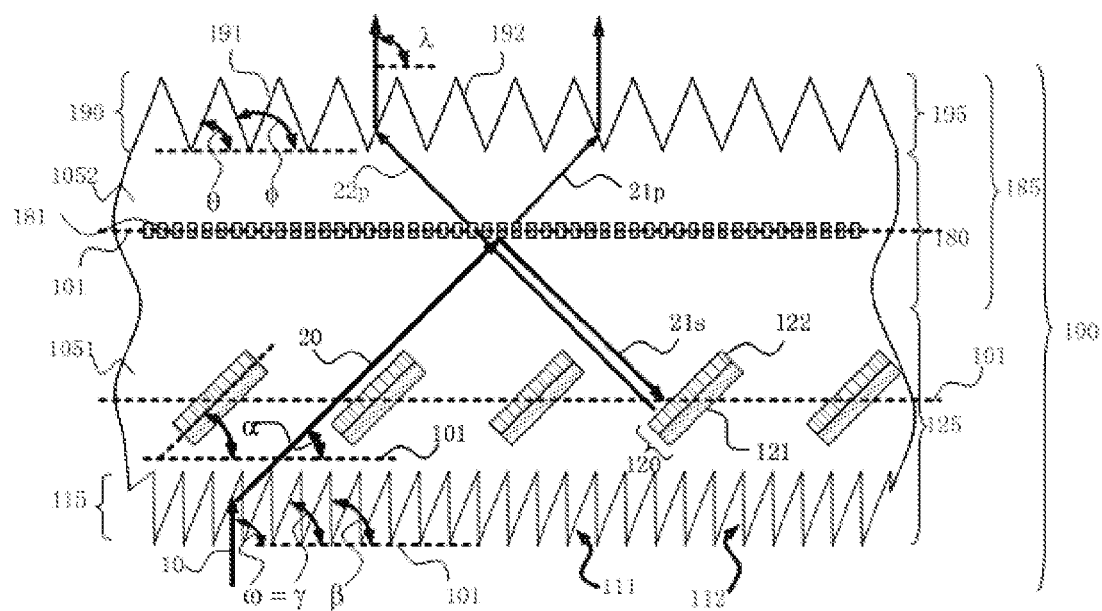
FIG. 8b is a cross-sectional view of the integrated planar polarizing device of FIG. 7 having a light-redirecting prismatic surface as the light-redirecting surface structure.

Specifically, the light-redirecting surface structure 195 may be a light-redirecting prismatic surface 190 in the front position, as shown in FIG. 8a, which has a continuous array of pairs of prismatic facets. The light-redirecting prismatic surface 190 comprises a planar array of first light-redirecting prismatic facets 191 and second light-redirecting prismatic facets 192. Each of the first light-redirecting prismatic facets 191 has a first outlet angle θ relative to the base plane 101, and is adapted to refract and collimate the third polarized light 22p to the output angle λ. The first light-redirecting prismatic facets 191 are continuously interleaved with second light-redirecting prismatic facets 192. Each of the second light-redirecting prismatic facets 192 has a second outlet angle φ relative to the base plane 101, and is adapted to refract and collimate the first polarized light 21p to the identical output angle λ relative to the base plane 101.

In practical application, the device 100 may be provided with the light-reflecting surface structure 115 and/or the light-redirecting prismatic surface 190. FIG. 7 depicts a preferable embodiment of the present invention on the integrated planar polarizing device 100. The light-directing surface structure 115 deviates the original light beam 10 in the original angle ω, upon receiving, to the incident light beam 20 transmitting inside the integrated planar polarizing device 100 in parallel to the micro reflective retarder plates 120. On the other hand, the light-redirecting surface structure 195 converges the diverged pair of the first polarized light 21p and the third polarized light 22p both in first polarization state P, after passing the planar polarizing wire grid array consisting of nano-scale reflective fine strips 181, to re-collimated light in a common collimated light angle λ.

Figure 8B:
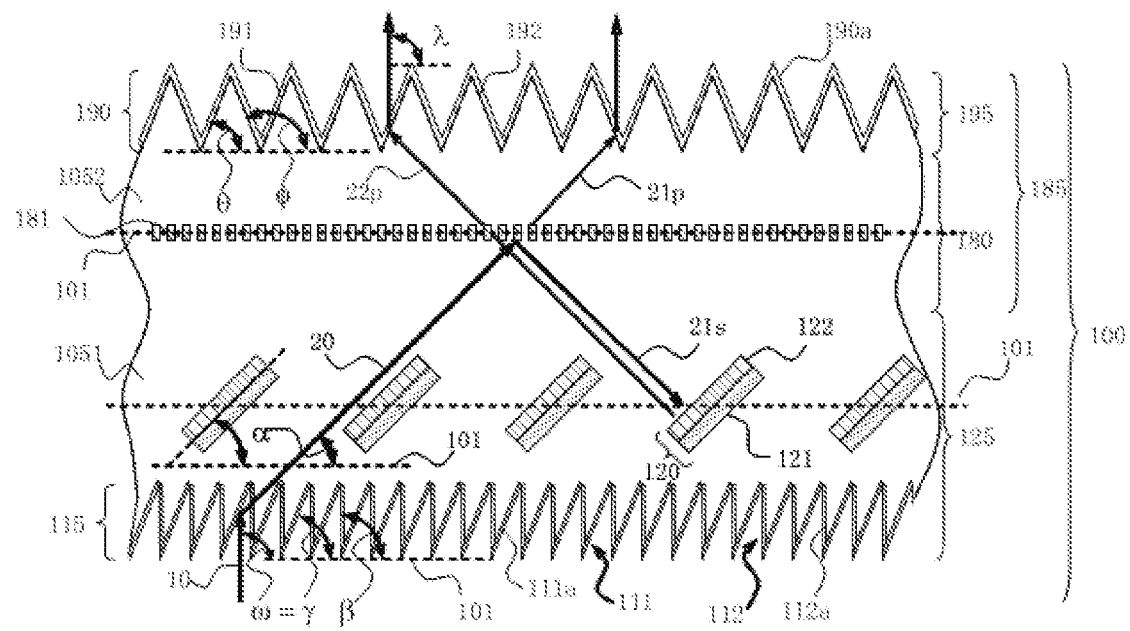

FIG. 8b is a cross-sectional view of the integrated planar polarizing device in other extended embodiments of the present invention from the embodiments stated above and illustrated in FIG. 7. For configuring refraction of the first polarized light 21p and the third polarized light 22p both in first polarization state P precisely to the collimated output angle λ, preferably 90°, the light-redirecting prismatic surface is completely coated with a light-redirecting index matching coating 190a in one extended embodiment from the previous stated above.

Preferably, the reflective polarization plate 180 and the light-redirecting surface structure 195 are embedded in a second transparent medium 1052 as a collimating output polarizing plate 185, as shown in FIG. 8a and FIG. 8b. In addition, the second transparent medium 1052 may be also made from silicon dioxide and the light-redirecting plate 195 fabricated through the similar silicon-based wafer micromachining process measures. The reflective polarization plate 180 is made of a planar polarizing wire grid which consists of a array of nano-scale reflective fine strips 181 regularly spaced apart in parallel to the light-redirecting prismatic structure 195 and embedded in the second transparent medium 1052.

Embodiment Five

Figure 9A:
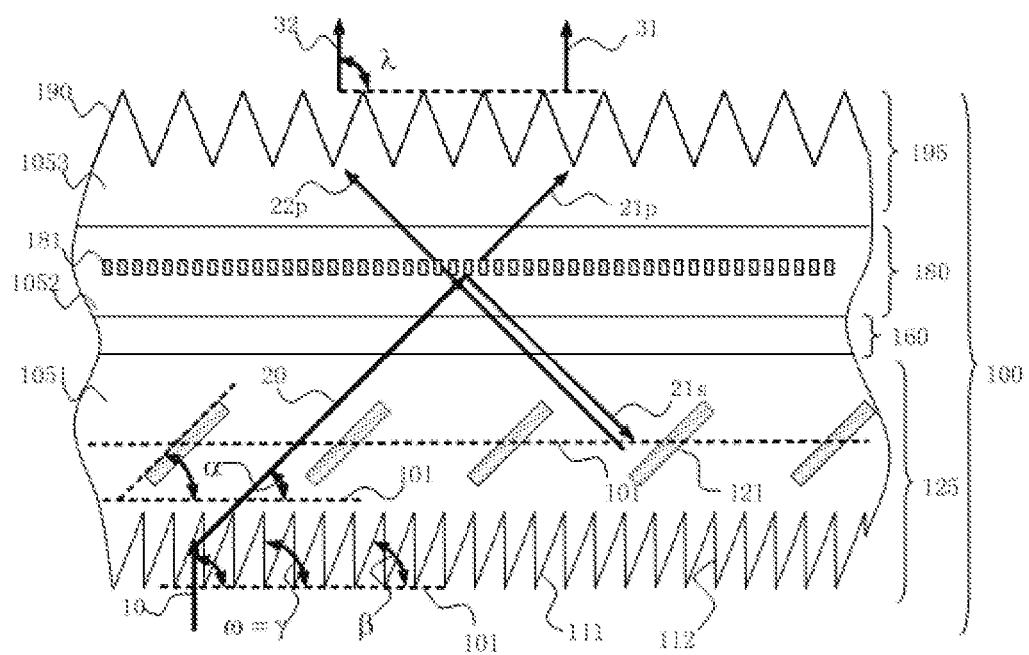
FIG. 9a and FIG. 9b are cross-sectional views of the integrated planar polarization device according to extended embodiments of the present invention.
Figure 9B:
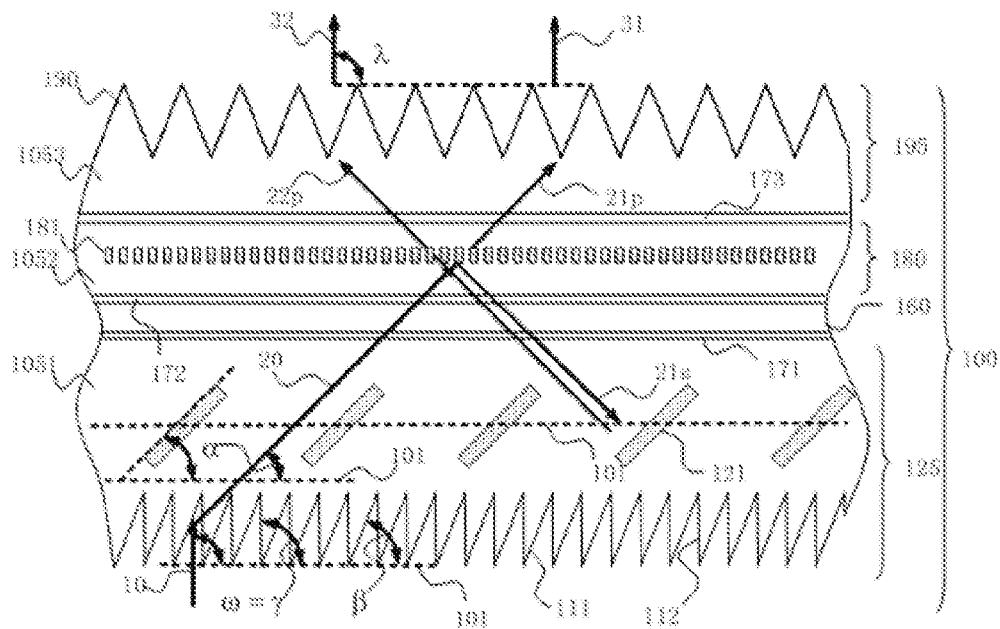

FIG. 9a and FIG. 9b are cross-sectional views of the integrated planar polarization device according to extended embodiments of the present invention. As shown in FIG. 9a, the micro mirrors 121 are embedded in the first transparent medium 1051 as the embedded micro mirror plate 125, the light-redirecting surface structure 195 is embedded in a third transparent medium 1053 as a light-redirecting plate, and the reflective polarization plate 180 is embedded in the second transparent medium 1052. Specifically, the light-redirecting surface structure 195 may be the light-redirecting prismatic surface 190 stated above. The reflective polarization plate 180 may be the planar polarizing wire grid array of nano-scale reflective fine strips 181. The embedded micro mirror plate 125, the quarter wave retarder plate 160, the reflective polarization plate 180 and the light-redirecting plate are adherently stacked.

As shown in FIG. 9b, a third index matching film 173 may be adherently sandwiched between the reflective polarization plate 180 and the light-redirecting surface structure 195 for minimizing reflection and diffraction of transmitting light as well as adjusting the refraction angle if necessary for light re-collimation as described above.

Preferably, the device 100 further comprises a first index matching film 171 and a second index matching film 172. With appropriate optical indices and surface, the first index matching film 171 is adherently sandwiched by the embedded micro mirror plate 125 and the quarter wave retarder film 160, and the second index matching film 172 is adherently sandwiched by the quarter wave retarder film 160 and the reflective polarization plate 180 for minimizing reflection and diffraction of transmitting light.

The first transparent medium 1051, the second transparent medium 1052 and/or the third transparent medium 1053 may be made of silicon oxide or solid transparent polymeric materials In the above embodiments of the present invention, the integrated planar polarizing device is made mostly from solid state transparent materials such as silicon, silicon dioxide and aluminum and readily fabricated through silicon wafer-based micromachining processes, or solid transparent polymeric materials via micro molding and film deposition processing, that efficiently converts increased portion of unpolarized light to linearly polarized light suitable for use in a single-panel LCOS projection systems.

Embodiment Six

Complimentary embodiments on the method of fabricating a solid state prismatic surface containing variable micro patterns and structures are disclosed, for constructing such an integrated planar polarizing device, through typical silicon wafer-based micromachining processes.

Figure 10:
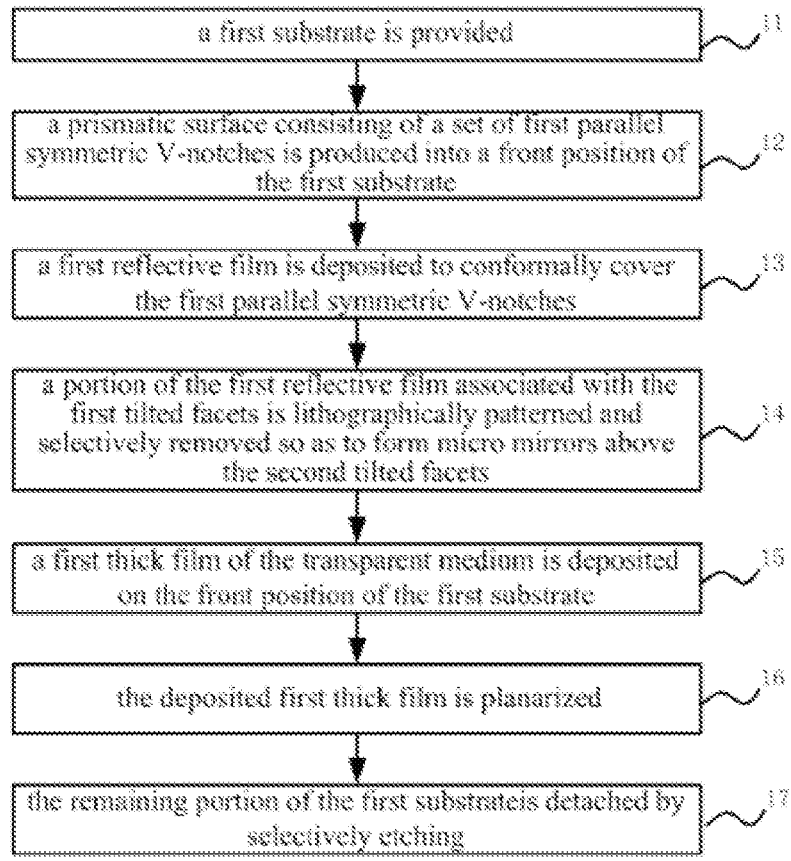
FIG. 10 is a flow chart of a method of fabricating the embedded micro mirror plate according to embodiment six of the present invention.
Figure 11:
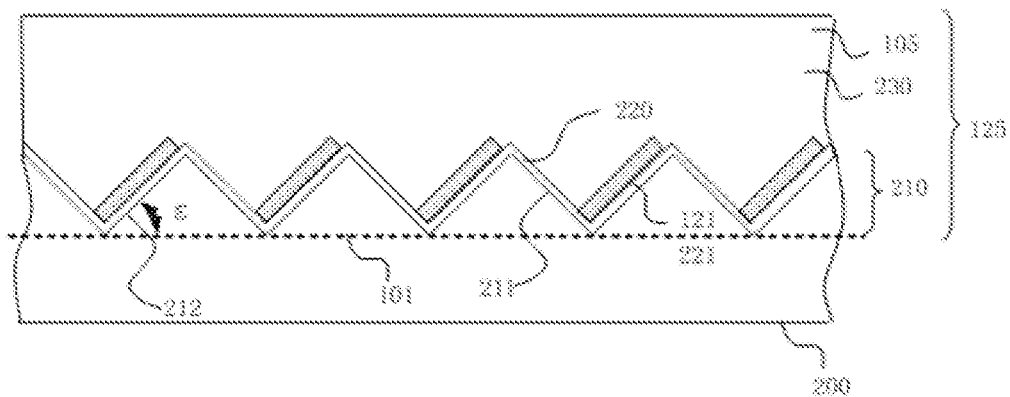
FIG. 11 is a cross-sectional view of the embedded micro mirror plate fabricated by the method according to embodiment six of the present invention.

FIG. 10 is a flow chart of a method of fabricating the embedded micro mirror plate according to embodiment six of the present invention. The method comprises the following steps:

step 11, a first substrate 200 is provided;

step 12, a prismatic surface consisting of a set of first parallel symmetric V-notches 210 is produced into a front position of the first substrate 200. Each of the first parallel symmetric V-notches 210 consists of a pair of first tilted facet 211 and second tilted facet 212, and each second tilted facet 212 is equal to a base tilted angle ε relative to the base plane 101;

Preferably the first substrate 200 is a single crystalline silicon substrate and thus, photolithographic patterning and anisotropic etching could be used to first produce the first parallel symmetric V-notches 210 on two symmetric crystal planes with the base tilted angle $\epsilon$ close to 54.74°, which could be further flattened close to 45°.

step 13, a first reflective film 221 is deposited to conformally cover the first parallel symmetric V-notches 210 on the first substrate 200. The first reflective film 221 may be preferably made from any one or any combination of aluminum, silver, copper, titanium and gold;

Alternatively, before depositing the first reflective film 221, a first buffer film 220 made of the transparent medium 105, preferably silicon dioxide, is deposited above the first symmetric V-notches 210 to form a buffer layer with the first substrate 200;

step 14, a portion of the first reflective film 221 associated with the first tilted facets 211 is lithographically patterned and selectively removed so as to form micro mirrors 121 above the second tilted facets 212;

step 15, a first thick film 230 of the transparent medium 105 is deposited on the front position of the first substrate 200;

step 16, the deposited first thick film 230 is planarized; and step 17, the remaining portion of the first substrate 200 is detached by selectively etching, or combination of first mechanical grinding, and then selectively etching removal of the first substrate 200 from the first thick film 230 and the micro mirrors 121, as shown in FIG. 11.

The above method could fabricate the embedded micro mirror plate 125 stated in the above embodiments.

Based on the above embodiments, the method could further comprise the following steps:

A second thick film of the transparent medium is deposited above the exposed first symmetric V-notches in a back position relative the first position. The second thick film is planarized. A second substrate is provided to produce a set of second parallel asymmetric V-notches into the second substrate, each of the second parallel asymmetric V-notches consisting of a set of incident-reflecting facet and incident parallel facet. Then a third thick film of the transparent medium is deposited above the second parallel asymmetric V-notches, and the deposited third thick film is planarized. The second substrate with the planarized third thick film is adhered to be bonded to the planarized second thick film in the back position. Finally, the remaining portion of the second substrate is detached from the planarized third thick film. The first substrate and/or the second substrate preferably are made of single crystalline silicon.

Another preferable embodiment is further provided, and FIGS. 12a, 12b, 12c, 12d and 12e are a series of cross-sectional schematics illustrating the method for fabricating subcomponents of an integrated planar polarization device 100 in several embodiments of the present, and in particularly, the embedded micro mirror plate 125.

The first substrate 200 is provided on which a prismatic surface consisting of the planar array of first parallel symmetric V-notches 210 is first produced. After depositing the first reflective film 221, the method further comprises a step of forming a quarter wave retarder film 222 above the continuous first reflective film 221. A portion of the first reflective film 221 and the quarter wave retarder film 222 associated with the first tilted facets 211 is lithographically patterned and selectively removed to form the planar array of micro quarter wave retarders 122 stacked on the micro mirrors 121 above the second tilted facets 212.

Figure 12A:
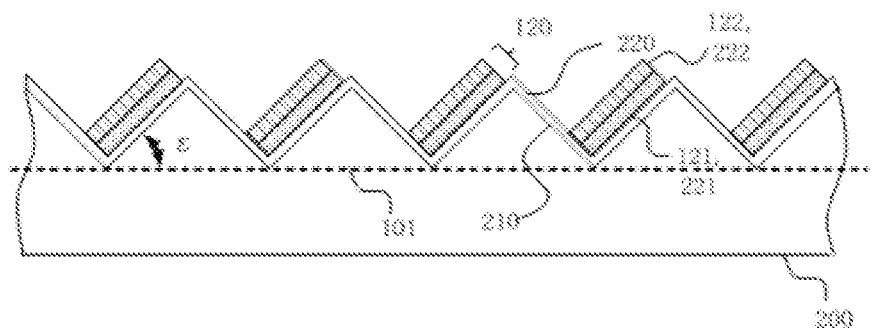
FIGS. 12a, 12b, 12c, 12d and 12e are a series of cross-sectional schematics illustrating the method for fabricating the embedded micro mirror plate.

In one extended embodiment, another thin buffer layer, also preferably made of the same transparent material 105, could be deposited between the reflective thin film 221 and the quarter waver retarder film to form a composite film. Using photolithographic patterning and etching, the composite film on one side of the first parallel symmetric V-notches 210 are removed while the micro reflective retarder plates 120 are formed on the opposite side of the first parallel symmetric V-notches 210, as shown in FIG. 12a.

Figure 12B:
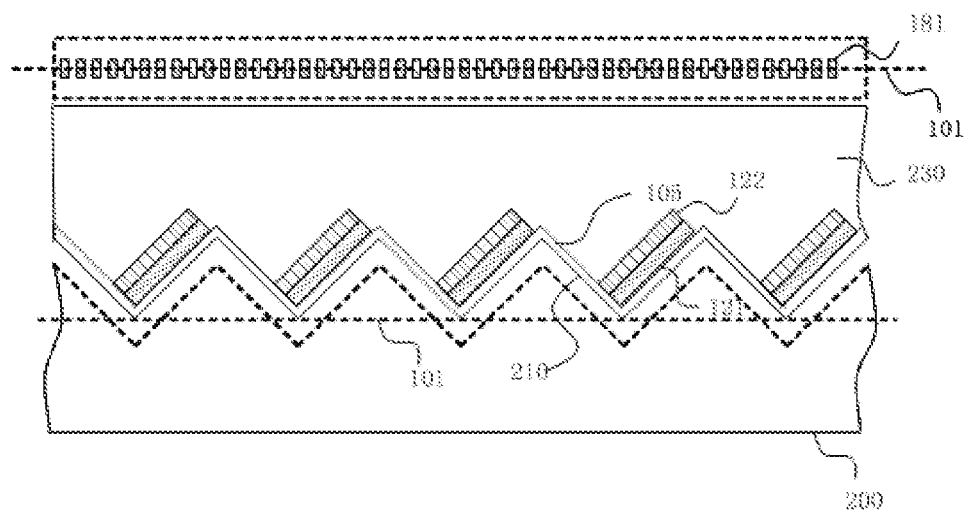

The first thick film 230 made of the transparent medium 105 is deposited, topping the micro reflective retarder plates 120 and the first parallel symmetric V-notches 210, the later partially exposed upon etching, and then planarized as shown in FIG. 12b. In another embodiment of the present invention, the planar polarizing wire grid array consisting of nano-scale reflective fine strips 181, regularly spaced-apart in parallel to the base plane 101, is fabricated on top of the planarized first thick film 230 also through deposition, lithographic patterning and etching, gap filling by the transparent medium 105 and planarization.

Figure 12C:
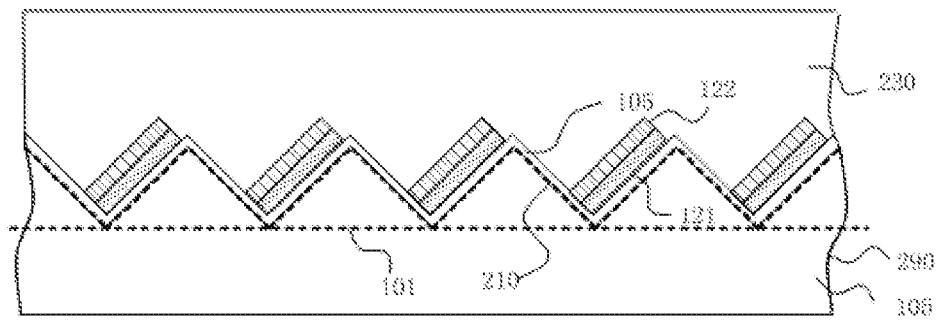

The remaining first substrate 200 is then selectively removed and detached as shown in FIG. 12b, after being used for forming the micro reflective retarder plates 120 and if applicable, the planar polarizing wire grid array of nano-scale reflective fine strips 181, both embedded into the transparent medium 105 as the core of the integrated planar polarizing device 100. A second thick film 290 of the transparent medium 105 is deposited onto the exposed first symmetric V-notches 210 on the back position as shown in FIG. 12c, and then planarized in parallel to the base plane 101.

Figure 12D:
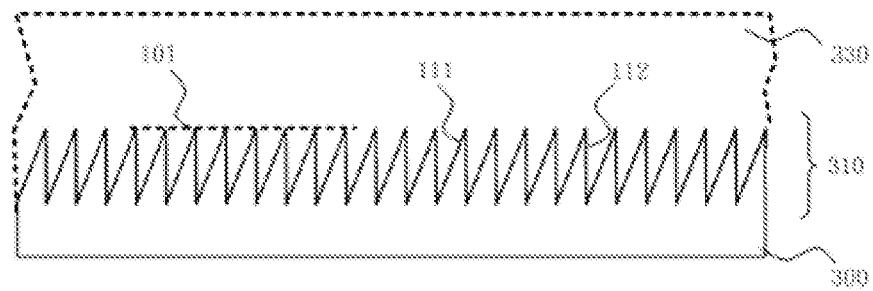

FIG. 12d illustrates the method for forming the light-directing prismatic surface 110 in the defined back position of the light path, also using the similar approach stated above. A second substrate 300, preferably a single crystal silicon substrate, is used for first producing the second parallel asymmetric V-notches 310, through typical processes in silicon micromachining such as anisotropic etching and patterned hard mask etching. The notch-etched surface of the second substrate 300 is then coated with a third thick film 330 of the transparent material 105 which is later planarized in a similar approach stated above. Optionally, each side of the V-notches 310 could be coated with either a reflection enhancing coating or antireflective film as presented above.

Figure 12E:
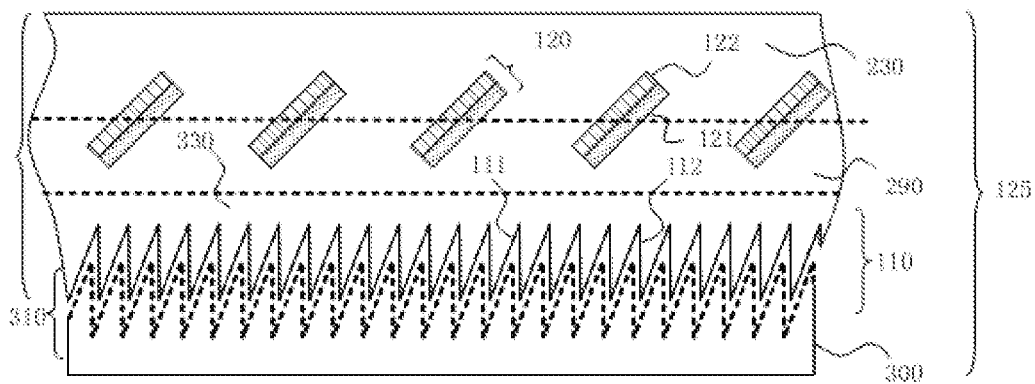

FIG. 12e illustrates the assembly of the two previously processed substrates into an embedded micro mirror plate 125 consisting of the planar array of micro reflective retarder plates 120 in the front position and the light-directing prismatic surface 110. The planarized surface of the second thick film 290 in the back position is adherently bonded to the planarized surface of the third thick film 330 in the front position. Finally, the remaining part of the second substrate 300 is selectively removed to expose the light-directing prismatic surface 110, to form the embedded micro mirror plate 125. Alternatively, the incident-reflecting facets 111 and the incident-parallel facets 112 are coated with a reflection-enhancing coating and an antireflective coating respectively after the substrate detachment instead of the coating process stated above in the last paragraph.

Embodiment Seven

Figure 13:
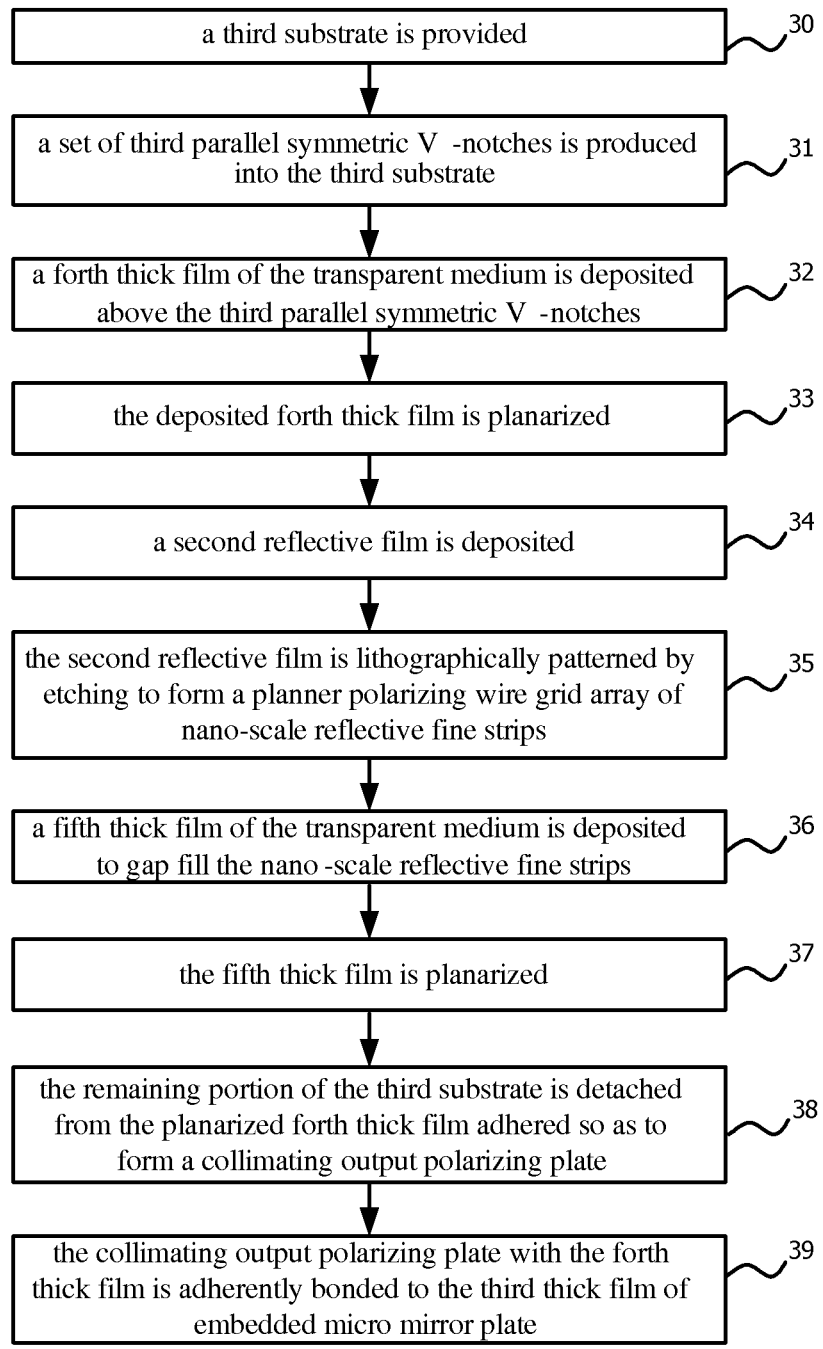
FIG. 13 is a flow chart of a method of fabricating an integrated planar polarizing device according to embodiment seven of the present invention.

FIG. 13 is a flow chart of a method of fabricating an integrated planar polarizing device according to embodiment seven of the present invention. The method comprises the above method of fabricating the embedded micro mirror plate 125, and the method further comprises the following steps:

step 30, a third substrate is provided;

step 31, a set of third parallel symmetric V-notches is produced into the third substrate;

step 32, a forth thick film of the transparent medium is deposited above the third parallel symmetric V-notches;

step 33, the deposited forth thick film is planarized;

step 34, a second reflective film is deposited;

step 35, the second reflective film is lithographically patterned by etching to form a planar polarizing wire grid array of nano-scale reflective fine strips;

step 36, a fifth thick film of the transparent medium is deposited to gap fill the nano-scale reflective fine strips;

step 37, the fifth thick film is planarized;

step 38, the remaining portion of the third substrate is detached from the planarized forth thick film adhered so as to form a collimating output polarizing plate; and step 39, the collimating output polarizing plate with the forth thick film is adherently bonded to the third thick film of embedded micro mirror plate.

In the above embodiment, the steps 30~38 is a method of fabricating the collimating output polarizing plate 185 stated in the above embodiments. The third substrate may be made of single crystalline silicon.

Figure 14A:
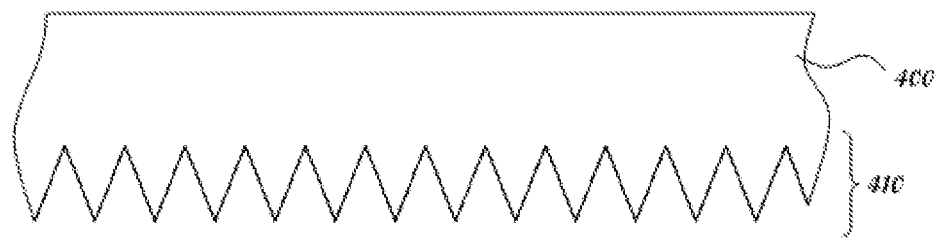
FIGS. 14a, 14b and 14c are a series of cross-sectional schematics illustrating the method for fabricating the collimating output polarizing plate 185 according to one embodiment of the present invention.
Figure 14B:
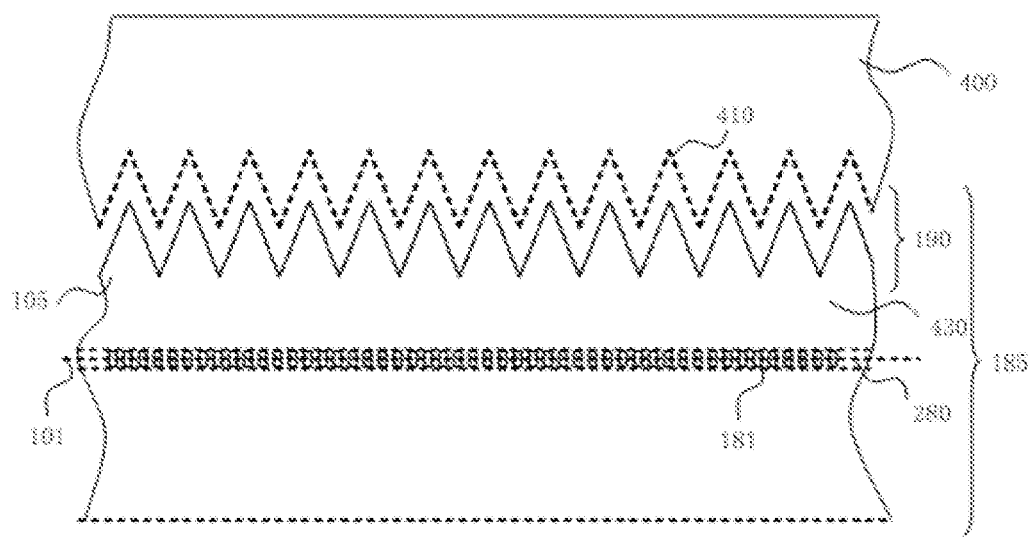
Figure 14C:
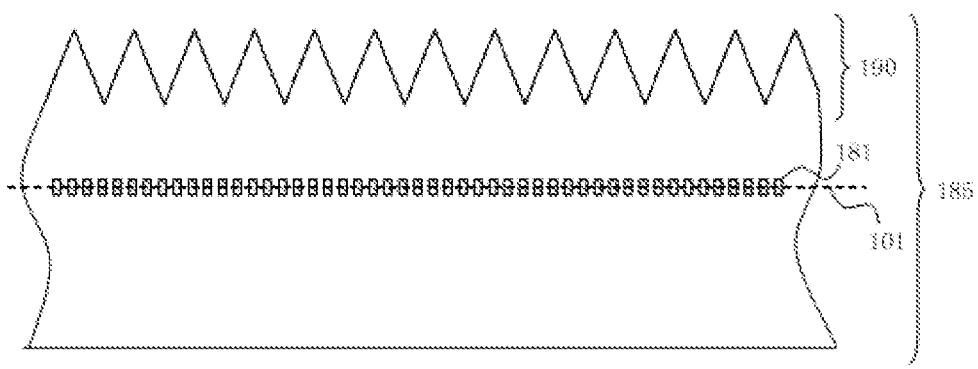

FIGS. 14a, 14b and 14c are a series of cross-sectional schematics illustrating the method for fabricating the collimating output polarizing plate 185 as another core subcomponent of the integrated planar polarization device 100 in several embodiments of the present invention. A continuous planar array of third parallel symmetric V-notches 410 defining the profile of the light-redirecting prismatic surface 190 is first formed on a third substrate 400, preferably a single-crystal silicon substrate. A forth thick film 430 of the transparent material 105 is deposited unto the third parallel symmetric V-notches 410 on the third substrate 400 and then planarized. On top of the planarized forth thick film 430, the planar polarizing wire grid array consisting of nano-scale reflective fine strips 181 is fabricated first by depositing and lithographically patterning a second reflective film 280, preferably made from any one or any combination of silver, aluminum, copper, titanium and gold. Then a forth thick film 430 of the transparent medium 105 is deposited to gap-fill gaps and form adequate transparent coverage on the nano-scale reflective fine strips 181, and then planarized, as shown in FIG. 14b. The remaining part of the third substrate 400 is then selectively removed as previously for the first substrate 200 and the second substrate 300, to expose the light-directing prismatic surface 190. Optionally, the light-directing prismatic surface 190 is further coated with a refraction index matching film for achieving the same output angle λ for the first polarized light 21p and the third polarized light 22p at different angle impinging the light-redirecting prismatic surface 190, as shown in FIG. 14c.

Last but not least in another embodiment of the present invention, a comprehensive integrated planar polarizing device 100 as shown in FIG. 8b is readily to be assembled by bonding the collimating output polarizing plate 185, fabricated as shown in FIGS. 14a, 14b and 14c with the embedded micro mirror plate 125 produced as illustrated in FIGS. 12a, 12b, 12c, 12d and 12e.

In another embodiment of this invention, either one or both of the first and second transparent medium and either one or both of the embedded micro mirror plate and the light-redirecting plate fabricated by micro molding and selective film deposition or photolithographic patterning measures adequately to the first transparent medium and the second transparent medium of solid polymeric materials.

The embodiments described and illustrated herein are illustrative only, and are not to be considered as limitations upon the scope of the present invention. Those skilled in the art will recognize that other variations and modification may be made in accordance with the spirit and scope of the present invention.

Finally, it should be noted that the above embodiments are merely provided for describing the technical solutions of the present invention, but not intended to limit the present invention. It should be understood by those of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

What is claimed is:

1. An integrated planar polarizing device, in the order of incidence along an optical path of an incident light beam from back position to front position, comprising a planar array of micro mirrors, a quarter wave retarder film and a reflective polarization plate, wherein the planar array of micro mirrors are regularly spaced-apart in an identical tilted angle α relative to a base plane;

the quarter wave retarder film is positioned between the micro mirrors and the reflective polarization plate;

the reflective polarization plate is in parallel to the base plane and is adapted to transmit and polarize a first polarized light of the incident light beam in a first polarization state, and to reflect and polarize a second polarized light of the incident light beam in a second polarization;

the micro mirrors are adapted to reflect the second polarized light passing and polarized through the quarter wave retarder film a first time to pass and be polarized through the quarter wave retarder film a second time, thereby converting the second polarized light to be a third polarized light in the first polarization state which can transmit through the reflective polarization plate; and the planar array of micro mirrors, the quarter wave retarder film and the reflective polarization plate are embedded in a transparent medium.

2. The integrated planar polarizing device according to claim 1, wherein the reflective polarization plate is a planar polarizing wire grid array of nano-scale reflective fine strips, regularly spaced-apart in parallel to the base plane.

3. The integrated planar polarizing device according to claim 1, wherein the quarter wave retarder film is one layer of quarter wave retarder plate in parallel to the base plane, and the quarter wave retarder plate is adherently sandwiched between the reflective polarization plate and an embedded micro mirror plate, in which the micro mirrors is embedded.

4. The integrated planar polarizing device according to claim 1, wherein the quarter wave retarder film is a planar array of micro quarter wave retarders, each stacked above each of the micro mirrors, being tilted at the identical tilted angle α relative to the base plane and facing the front position; and the micro quarter wave retarders and the micro mirrors form a planar array of micro reflective retarder plates.

5. The integrated planar polarizing device according to claim 1, further comprising a light-directing surface structure in the back position, adapted to direct an original light beam in an original incident angle ω relative to the base plane to become the incident light beam at an incident angle relative to the base plane, wherein the incident angle is equal to the tilted angle α.

6. The integrated planar polarizing device according to claim 5, wherein the micro mirrors and the light-directing surface structure are embedded in a first transparent medium as an embedded micro mirror plate.

7. The integrated planar polarizing device according to claim 5, wherein the quarter wave retarder film is a planar array of micro quarter wave retarders, each stacked above each of the micro mirrors, being tilted at the identical tilted angle $\alpha$ relative to the base plane and facing the front position, and the micro quarter wave retarders and the micro mirrors form a planar array of micro reflective retarder plates; and the micro reflective retarder plates and the light-directing surface structure are embedded in a first transparent medium as an embedded micro mirror plate.

8. The integrated planar polarizing device according to claim 5, wherein the light-directing surface structure is a light-directing prismatic surface in the back position, the light-directing prismatic surface comprises a planar array of incident-reflecting facets at a first inlet angle $\beta$ relative to the base plane continuously interleaved with incident-parallel facets in a second inlet angle $\gamma$ relative to the base plane.

9. The integrated planar polarizing device according to claim 8, wherein the incident-parallel facets are configured perpendicular to the base plane.

10. The integrated planar polarizing device according to claim 8, wherein each of the incident-parallel facets is coated with an incident-parallel antireflective film.

11. The integrated planar polarizing device according to claim 8, wherein each of the incident-reflecting facets is coated with an incident-reflecting enhancing film.

12. The integrated planar polarizing device according to claim 11, wherein the incident-reflecting enhancing film is made of any one or any combination of silver, aluminum, copper, titanium and gold.

13. The integrated planar polarizing device according to claim 5, wherein the light-directing surface structure is a complementary light-directing prismatic surface in the back position, the complementary light-directing prismatic surface comprises a planar surface array of incident-facing facets at a third inlet angle $\alpha+90°$ relative to the base plane continuously interleaved with incident-parallel facets at a second inlet angle $\gamma$ relative to the base plane, and the second inlet angle $\gamma$ is equal to the original incident angle $\omega$ and the tilted angle $\alpha$.

14. The integrated planar polarizing device according to claim 13, wherein each of the incident-facing facets is coated with an antireflective film.

15. The integrated planar polarizing device according to claim 1, wherein further comprising a light-redirecting surface structure in the front position adapted to refract the first polarized light and the third polarized light to be transmitted out of the light-redirecting surface structure in an identical output angle $\lambda$ relative to the base plane.

16. The integrated planar polarizing device according to claim 15, wherein the reflective polarization plate and the light-redirecting surface structure are embedded in a second transparent medium as a collimating output polarizing plate.

17. The integrated planar polarizing device according to claim 15, wherein the micro mirrors are embedded in a first transparent medium as an embedded micro mirror plate, the light-redirecting surface structure is embedded in a third transparent medium as a light-redirecting plate, and the embedded micro mirror plate, the quarter wave retarder plate, the reflective polarization plate and the light-redirecting plate are adherently stacked.

18. The integrated planar polarizing device according to claim 15, wherein the light-redirecting surface structure is a light-redirecting prismatic surface in the front position, and the light-redirecting prismatic surface comprises a planar array of:
first light-redirecting prismatic facets, each in a first outlet angle $\theta$ relative to the base plane, adapted to refract the third polarized light to the output angle $\lambda$; and continuously interleaved with
second light-redirecting prismatic facets, each in a second outlet angle $\phi$ relative to the base plane, adapted to refract the first polarized light to the output angle $\lambda$.

19. The integrated planar polarizing device according to claim 18, wherein the light-redirecting prismatic surface is configured such that the first outlet angle $\theta$ is equal to the tilted angle $\alpha$ and the second outlet angle $\phi$ is equal to $\alpha+90°$.

20. The integrated planar polarizing device according to claim 18, wherein the light-redirecting prismatic surface is completely coated with a light-redirecting index matching coating.

21. The integrated planar polarizing device according to claim 17, wherein a third index matching film is adherently sandwiched between the reflective polarization plate and the light-redirecting surface structure.

22. The integrated planar polarizing device according to claim 17, further comprising a first index matching film and a second index matching film, wherein the first index matching film is adherently sandwiched by the embedded micro mirror plate and the quarter wave retarder plate, and the second index matching film is adherently sandwiched by the quarter wave retarder plate and the reflective polarization plate.

23. The integrated planar polarizing device according to claim 1, wherein the transparent medium is made of silicon oxide or solid transparent polymeric materials.

24. The integrated planar polarizing device according to claim 1, wherein the micro mirrors are made of any one or any combination of silver, aluminum, copper, titanium, mercury and gold.

25. The integrated planar polarizing device according to claim 2, wherein the nano-scale reflective fine strips are made of any one or any combination of silver, copper, aluminum, titanium and gold.

26. The integrated planar polarizing device according to claim 1, wherein the tilted angle $\alpha$ of the micro mirrors is equal to 45°.

* * * * *